(12) United States Patent
Tarutani et al.

(10) Patent No.: US 11,901,659 B2
(45) Date of Patent: Feb. 13, 2024

(54) TERMINAL MATERIAL FOR CONNECTORS

(71) Applicant: MITSUBISHI MATERIALS CORPORATION, Tokyo (JP)

(72) Inventors: Yoshie Tarutani, Naka (JP); Kenji Kubota, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/633,268

(22) PCT Filed: Aug. 3, 2020

(86) PCT No.: PCT/JP2020/029688
§ 371 (c)(1),
(2) Date: Feb. 7, 2022

(87) PCT Pub. No.: WO2021/029254
PCT Pub. Date: Feb. 18, 2021

(65) Prior Publication Data
US 2022/0294140 A1  Sep. 15, 2022

(30) Foreign Application Priority Data

Aug. 9, 2019 (JP) ................................. 2019-146951
Apr. 27, 2020 (JP) ................................. 2020-078202

(51) Int. Cl.
*H01R 13/03* (2006.01)
*B32B 15/01* (2006.01)
(Continued)

(52) U.S. Cl.
CPC ............ *H01R 13/03* (2013.01); *B32B 15/01* (2013.01); *C22C 5/06* (2013.01); *C25D 3/12* (2013.01);
(Continued)

(58) Field of Classification Search
None
See application file for complete search history.

(56) References Cited

U.S. PATENT DOCUMENTS 5,967,860 A * 10/1999 Ricketts ................... C22C 5/06
428/673
2004/0238338 A1* 12/2004 Ganz ...................... H01R 13/03
200/262
(Continued)

FOREIGN PATENT DOCUMENTS

EP        3916133 A1   12/2021
JP        S46-1946 B1   1/1971
(Continued)

OTHER PUBLICATIONS

Supplementary European Search Report dated Jul. 14, 2023, issued for European Patent Application No. 20852948.7.

*Primary Examiner* — Wojciech Haske
(74) *Attorney, Agent, or Firm* — Locke Lord LLP (57) ABSTRACT

Providing a terminal material for connectors provided with a base material in which at least a surface layer is made of copper or copper alloy, a nickel-plating layer made of nickel or nickel alloy coating a surface of the base material, and a silver-nickel alloy plating layer formed on at least a part of the nickel-plating layer, the silver-nickel alloy plating layer having a film thickness of 0.5 µm to 20 µm inclusive, a nickel content of 0.03 at % to 1.20 at % inclusive, and an average crystal grain size of 10 nm to 150 nm inclusive, to improve abrasion resistance and heat resistance.

18 Claims, 2 Drawing Sheets

(51) Int. Cl.
*C25D 3/64* (2006.01)
*C22C 5/06* (2006.01)
*C25D 3/12* (2006.01)
*C25D 3/46* (2006.01)
*C25D 5/12* (2006.01)

(52) U.S. Cl.
CPC ................. *C25D 3/46* (2013.01); *C25D 3/64* (2013.01); *C25D 5/12* (2013.01); *B32B 2307/732* (2013.01); *B32B 2457/00* (2013.01)

(56) References Cited

U.S. PATENT DOCUMENTS

| | | | |
|---|---|---|---|
| 2013/0196174 A1* | 8/2013 | Zhang-Beglinger | C22C 5/06 428/647 |
| 2015/0079421 A1* | 3/2015 | Myers | H01R 13/03 427/125 |
| 2015/0079422 A1* | 3/2015 | Sunaga | C23C 14/165 428/673 |
| 2019/0214758 A1 | 7/2019 | Kato | |
| 2021/0158990 A1* | 5/2021 | Kubota | C25D 3/46 |

FOREIGN PATENT DOCUMENTS

| | | | | |
|---|---|---|---|---|
| JP | H01-306574 A | | 12/1989 | |
| JP | 2001-3194 A | | 1/2001 | |
| JP | 2007-46142 A | | 2/2007 | |
| JP | 2008-169408 A | | 7/2008 | |
| JP | 2009-79250 A | | 4/2009 | |
| JP | 2013-189680 A | | 9/2013 | |
| JP | 2017-150055 A | | 8/2017 | |
| JP | 2018-199839 A | | 12/2018 | |
| JP | 2019031732 A | * | 2/2019 | ............. B32B 15/01 |
| JP | 2022-021834 A | | 2/2022 | |
| WO | 2016/157713 A1 | | 10/2016 | |

* cited by examiner

TERMINAL MATERIAL FOR CONNECTORS

BACKGROUND OF THE INVENTION

Technical Field

The present invention relates to a terminal material for connectors having a useful film used for connection of electric wiring of vehicles and consumer equipment on which high current and high voltage are applied. Priority is claimed on Japanese Patent Application Nos. 2019-146951 filed Aug. 9, 2019, and 2020-078202 filed Apr. 27, 2020, the content of which is incorporated herein by reference.

Background Art

Conventionally, an on-vehicle connector used for connection of electric wiring of a vehicle and the like is known. The on-vehicle connecter (on vehicle terminal) is provided with a pair of terminals designed to be electrically connected by bringing a contact piece provided in a female terminal into contact with a male terminal inserted into the female terminal at a predetermined contact pressure.

As such a connecter (terminal), a tin-plated terminal in which generally tin plating is performed on a copper or copper alloy plate and performing reflow treatment was generally used. However, in recent years, in accordance with increase of current and voltage of vehicles, purposes of use of terminals with excellent heat resistance and abrasion resistance in which more current can be flown on which precious metal plating is performed are increased.

As the on-vehicle terminal for which the heat resistance and the abrasion resistance are required, a silver-plated terminal for connectors disclosed in Patent literature 1 is known, for example. The silver-plated terminal for connectors disclosed in Patent literature 1 is coated with a silver-plating layer on a surface of base material made of copper or copper alloy.

The silver-plating layer has a first silver-plating layer arranged at a lower layer side (base material side) and a second silver-plating layer arranged at an upper layer side on the first silver-plating layer, to be formed so that a crystal grain size of the first silver-plating layer is larger than a crystal grain size of the second silver-plating layer. That is, in the structure of Patent literature 1, by forming the crystal grain size of the first silver-plating layer to be larger than the crystal grain size of the second silver-plating layer, copper of the base material is restrained to be diffused into the second silver-plating layer.

Patent literature 2 discloses a copper or copper alloy member in which a silver or silver alloy layer having antimony concentration of 0.1 mass % or less is formed on at least a part of a surface of a copper or copper alloy member as base material and a silver alloy layer having antimony concentration of 0.5 mass % or more and Vickers hardness of 140 HV or more is formed as an outermost layer on the silver or silver alloy layer. That is, in the structure of Patent literature 2, the hardness is increased by adding antimony in the silver or silver alloy layer to improve the abrasion resistance of the copper or copper alloy member.

CITATION LIST

Patent Literature 1: Japanese Unexamined Patent Application, First Publication No. 2008-169408

Patent Literature 2: Japanese Unexamined Patent Application, First Publication No. 2009-79250

SUMMARY OF INVENTION

Technical Problem

In the structure of Patent literature 1, the silver-plating layer coating the surface of the base material is deteriorated in the hardness as the crystal grain size of silver get larger by time course and use in high temperature environment (coarsening), so that the abrasion resistance is deteriorated by use for a long time and under the high temperature environment. In order to compensate for the deterioration of the abrasion resistance, a film thickness of the silver-plating layer can be considered being thicker; but there is a problem in costs. In the structure of Patent literature 2, there is a problem of increasing contact resistance by oxidization after antimony diffuses on the outermost surface of the plating layer by heating and condensed.

The present invention is achieved in consideration of the above circumstances, and has an object to provide a terminal material for connectors which can improve the abrasion resistance and heat resistance.

Solution to Problem

A terminal material for connectors of the present invention is provided with a base material wherein at least a surface layer is made of copper or copper alloy; a nickel-plating layer made of nickel or nickel alloy coating a surface of the base material; and a silver-nickel alloy plating layer formed on at least a part of the nickel-plating layer, having a film thickness 0.5 μm or more and 20.0 μm or less, a nickel content 0.03 at % or more and 1.20 at % or less, and an average crystal grain size 10 nm or more and 150 nm or less.

In the present invention, since the silver-nickel alloy plating layer formed on the surface contains nickel, the average crystal grain size is small in comparison with the silver-plating layer and adhesion phenomenon when sliding is suppressed, so that the frictional coefficient is low and the abrasion resistance can be improved.

In this case, since the average crystal grain size of the silver-nickel alloy plating layer is minute as 10 nm or more and 150 nm or less and nickel is contained, the crystal grains are prevented from coarsening even in high temperature environment, and reduction of the abrasion resistance is also small in the high temperature environment. When the silver-nickel alloy plating layer is formed, there is a case in which the average crystal grain size of the silver-nickel alloy plating layer exceeds 150 nm in a case in which eutectoid of nickel is not generated or an amount of eutectoid is less than 0.03 at %. In this case, the amount of eutectoid of nickel is small and it becomes a plating layer having characteristic alike that of pure silver, the crystal grains are coarsened in the high temperature environment and the abrasion resistance may be deteriorated. Although it is preferable that the average crystal grain size be small, it is not practical since reliability of measurement results are low in a case in which crystal grains smaller than 10 nm are measured.

Moreover, since nickel has higher melting point comparing with antimony, it is difficult to be diffused even in the high temperature environment; accordingly, it is not the same as antimony, and it is difficult to be condensed in the outermost surface even in the high temperature environment. Accordingly, it is possible to prevent the contact resistance from increasing in the high temperature environment, the crystal grain size can be maintained small, the friction coefficient can be maintained low, and the abrasion resistance can be maintained.

Difference of atomic radius between silver and nickel is large comparing with difference of atomic radius between silver and antimony; accordingly, the nickel content in the silver-alloy plating layer is 0.03 at % or more and 1.20 at % or less, only by slightly eutectoid of nickel, the crystal grain size can be made fine.

If the nickel content of the silver-nickel alloy plating layer is less than 0.03 at %, the heat resistance and the abrasion resistance are deteriorated and the friction coefficient is also increased. If the nickel content exceeds 1.20 at %, the conductor resistance of the silver-nickel alloy plating layer is increased and the contact resistance in the high temperature environment is easily increased.

If the film thickness of the silver-nickel alloy plating layer is less than 0.5 μm, the heat resistance and the abrasion resistance cannot be improved; and if it exceeds 20.0 μm, breakages occur by press machining or the like since the silver-nickel alloy plating layer is too thick.

As another aspect of the terminal material for connectors, a silver-plating layer wherein silver purity except for C, H, S, O and N which are gas components is 99 mass % or more and a film thickness is 0.01 μm or more and 2.0 μm or less may also be provided.

Since the relatively soft silver-plating layer is formed on the surface, the abrasion resistance is improved by its lubrication effect. If the film thickness is less than 0.01 μm, the silver-plating layer is too thin, so that the effect of improving the abrasion resistance is poor and it is easy to be worn and disappeared in early time. If the thickness exceeds 2.0 μm, since the soft silver-plating layer is thick, the friction coefficient tends to increase. "Except for C, H, S, O, and N which are gas components" means excepting elements of gas components.

As further another aspect of the terminal material for connectors, a film thickness of the nickel-plating layer is preferably 0.2 μm or more and 5.0 μm or less.

If the film thickness of the nickel-plating layer is less than 0.2 μm, copper diffuses from the base material made of copper or copper alloy into the silver-nickel alloy plating layer in the high temperature environment. If the copper diffused into the silver-nickel alloy plating layer diffuses to the outermost surface of the plating film, copper is oxidized and the contact resistance increases, and there is a possibility of reducing the heat resistance. On the other, if the film thickness of the nickel-plating layer exceeds 5.0 μm, there is a fear of occurring breakages by bending machining or the like. The film thickness of the nickel-plating layer is more preferably 0.3 μm or more and 2.0 μm or less.

Advantageous Effects of Invention

According to the present invention, the abrasion resistance and the heat resistance of a terminal material for connectors can be improved.

DESCRIPTION OF EMBODIMENTS

Embodiments of the present invention will be explained below using drawings.

[Structure of Terminal Material for Connector]

Figure 1:
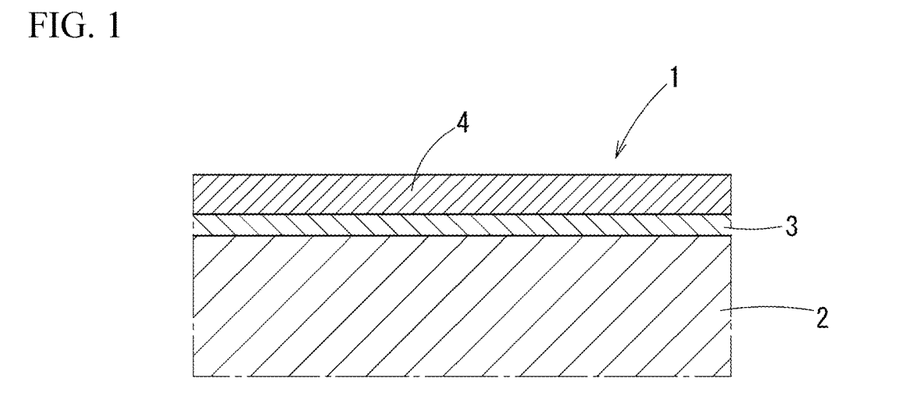
FIG. 1 It is a cross sectional view schematically showing a terminal material for connectors according to an embodiment of the present invention.

A terminal material 1 for connectors of a present embodiment is provided with, as a cross section is schematically shown in FIG. 1, a base material 2 having a plate shape in which at least a surface layer is made of copper or copper alloy, a nickel-plating layer 3 made of nickel or nickel alloy formed on an upper surface of the base material 2, and a silver-nickel plating layer 4 formed on an upper surface of the nickel-plating layer 3.

A surface layer of the base material 2 is not particularly limited in the composition if it is made of copper or copper alloy. In this embodiment, as shown in FIG. 1, the base material 2 is composed of a plate material made of copper or copper alloy such as an oxygen-free copper (C10200), Cu—Mg based copper alloy (C18665) or the like, but may be composed of a plated material subjected to copper plating or copper-alloy plating on the surface of a base material which is not copper or copper alloy. In this case, a metal plate other than copper can be used as the base material.

The nickel-plating layer 3 is formed by performing nickel-plating treatment composed of nickel or nickel alloy on the base material 2 and coats the base material 2. The nickel-plating layer 3 has a function of suppressing diffusion of copper from the base material 2 to the silver-nickel alloy plating layer 4 coating the nickel-plating layer 3.

A thickness (film thickness) of the nickel-plating layer 3 is preferably 0.2 μm or more and 5.0 μm or less; more preferably, 0.3 μm or more and 2.0 μm or less. If the thickness of the nickel-plating layer 3 is less than 0.2 μm, copper diffuses into the silver-nickel alloy plating layer 4 from the base material 2 in high temperature environment and the contact resistance value of the silver-nickel alloy layer 4 increases, so there is a possibility of reducing the heat resistance. By contrast, if the thickness of the nickel-plating layer 3 exceeds 5.0 μm, cracks may occur during bending process. The nickel-plating layer 3 is not particularly limited in the composition if it is made of nickel or nickel alloy.

The silver-nickel alloy layer 4 is formed by performing silver-strike plating treatment on the nickel-plating layer 3 and then performing silver-nickel alloy plating treatment, as described later. The silver-nickel alloy plating layer 4 is formed of alloy of silver and nickel on a surface of the terminal material 1 for connectors. Since intermetallic component is not generated between silver and nickel, the hardness of the surface of the terminal material 1 for connectors is prevented from being increased too high.

The nickel content of the silver-nickel alloy plating layer 4 is 0.03 at % or more and 1.20 at % or less; more preferably, 0.03 at % or more and 1.00 at % or less. If the nickel content of the silver-nickel alloy plating layer 4 is less than 0.03 at %, the heat resistance is deteriorated and the hardness of the silver-nickel alloy plating layer is deteriorated, so that the friction coefficient is increased and the abrasion resistance is decreased. If the nickel content of the silver-nickel alloy plating layer 4 exceeds 1.20 at %, the silver-nickel alloy plating layer 4 becomes too hard, so that cracks easily occur by press machining and the like, conductive resistance of the silver-nickel alloy plating layer 4 increases, and the contact resistance under the high temperature environment is easily increased.

Since the electric conductivity is lower in nickel than silver, when the nickel content exceeds 1.20 at %, the contact resistance of the silver-nickel alloy plating layer 4 increases. The silver-nickel alloy plating layer 4 contains 0.03 at % or more and 1.20 at % or less of nickel as described above, the hardness of the surface is increased and the abrasion resistance is improved. Specifically, the Vickers hardness of the silver-nickel alloy plating layer 4 is in a range of 130 HV to 250 HV.

Since nickel has higher melting point than that of antimony and is not easily diffused under the high temperature environment, unlike antimony, it is not easily condensed in the outermost surface even in the high temperature environment. Therefore, it is possible to suppress increase of the contact resistance under the high temperature environment and maintain the crystal grain size to be small, and the friction coefficient is maintained low and the abrasion resistance can be kept.

Since the difference of atomic radius between silver and nickel is larger than the difference of atomic radius between silver and antimony, the crystal grain size can be made fine, only by slightly eutectoid of nickel in the silver-nickel alloy plating layer to 0.03 at % or more and 1.20 at % or less.

Since the average crystal grain size is fine as 10 nm or more and 150 nm or less and nickel is contained in the silver-nickel alloy plating layer 4, the crystal grain size can be suppressed from coarsening even when exposed in the high temperature environment and deterioration of the abrasion resistance is also small in the high temperature environment. In a case in which nickel is not made eutectoid or the amount of eutectoid is less than 0.03 at % when the silver-nickel alloy plating layer is formed, the average crystal grain size of the silver-nickel alloy plating layer may exceed 150 nm. In this case, the amount of eutectoid of nickel is small and the plating layer has a characteristic near to that of pure silver, so that the crystal grain size is coarsened under the high temperature environment and the abrasion resistance may be deteriorated. It is preferable that the average crystal grain size be small; however, the crystal grain of less than 10 nm is not practical when it is measured because reliability of the result of measurement is low. The average crystal grain size is preferably 100 nm or less.

The film thickness of the silver-nickel alloy plating layer 4 is set to 0.5 μm or more and 20.0 μm or less; more preferably, 1.0 μm or more and 10.0 μm or less. If the film thickness of the silver-nickel alloy plating layer 4 is less than 0.5 μm, the heat resistance and the abrasion resistance cannot be improved; and if it exceeds 20.0 μm, the silver-nickel alloy plating layer 4 is too thick and cracks occur by press machining or the like.

Next, a manufacturing method of the terminal material 1 for connectors will be explained. The manufacturing method of the terminal material 1 for connectors is provided with a pre-treatment step cleansing a plate material to be the base material 2 in which at least the surface layer is made of copper or copper alloy; a nickel-plating layer forming step forming the nickel-plating layer 3 on the base material 2; a silver-strike plating step performing silver-strike plating treatment on the nickel-plating layer 3; and a forming step of a silver-nickel alloy plating layer forming the silver-nickel alloy plating layer 4 by performing silver-nickel alloy plating treatment after the silver-strike plating treatment.

[Pre-Treatment Step]

First, a plate material in which at least a surface layer is made of copper or copper alloy is prepared as the base material 2, and the pre-treatment is performed by degreasing, pickling, and the like to cleanse the surface.

[Nickel-Plating Layer Forming Step]

On at least a part of the surface of the base material 2 subjected to the pre-treatment, plating treatment forming a plating film made of nickel or nickel alloy is performed to form the nickel-plating layer 3 on the base material 2. Specifically, for example, the nickel-plating treatment is performed using a nickel-plating bath containing nickel sulfamate 300 g/L, nickel chloride hexahydrate 30 g/L, and boric acid 30 g/L under condition of bath temperature 45° C. and electric current density 3 A/dm$^2$. The nickel-plating treatment forming the nickel-plating layer 3 is not particularly limited as long as a dense film mainly of nickel is obtained, and an electroplating treatment using a known Watts bath may be used.

[Silver Strike Plating Step]

Activation is performed on the nickel-plating layer 3 using 5 to 10 mass % of aqueous solution of potassium cyanide, then the silver strike plating treatment is performed for a short time on the nickel-plating layer 3 to form a thin silver-plating layer.

The composition of a silver-plating bath for performing the silver-strike plating treatment is not particularly limited; for example, it is composed of silver cyanide (AgCN) 1 g/L to 5 g/L and potassium cyanide (KCN) 80 g/L to 120 g/L. To the silver-plating bath, using stainless steel (SUS316) as an anode, the silver-strike plating treatment is performed under condition of bath temperature 25° C. and electric current density 1 A/dm$^2$ for about 30 seconds to form the silver-strike plating layer. The silver-strike plating layer is made difficult to be identified as a layer by forming the silver-nickel alloy plating layer 4 afterward.

[Silver-Nickel Alloy Plating Layer Forming Step]

The silver-nickel alloy plating layer 4 is formed by performing the silver-nickel alloy plating treatment after the silver-strike plating treatment. The plating bath to form the silver-nickel alloy plating layer 4 may be a cyanide bath having a composition of silver cyanide (AgCN) 30 g/L to 50 g/L, potassium cyanide (KCN) 100 g/L to 150 g/L, potassium carbonate (K$_2$CO$_3$) 15 g/L to 40 g/L, nickel (II) potassium cyanide monohydrate (K$_2$[Ni(CN)$_4$]H$_2$O) 80 g/L to 150 g/L, and additive agent to precipitate the smooth silver-plating layer, for example.

The additive agent may be a general additive agent if no antimony is contained. it is preferable to control a mole ratio (A:B) be (3 to 4):(5 to 6) where silver cyanide is A mole and nickel (II) potassium cyanide monohydrate is B mole and A+B=0.7 mole to 1.0 mole.

In this plating bath, by performing the silver-nickel alloy plating using a pure silver plate as an anode under condition of bath temperature 25° C. and electric current density 4 A/dm$^2$ to 12 A/dm$^2$, the silver-nickel alloy plating layer 4 is formed with a film thickness of 0.5 μm or more and 20.0 μm or less.

If the electric current density of the silver-nickel alloy plating treatment is less than 4 A/dm$^2$, nickel is prevented from being eutectoid; and if the electric current density exceeds 12 A/dm$^2$, the appearance of the silver-nickel alloy plating layer 4 is damaged. The plating bath for forming the silver-nickel alloy plating layer is not limited to the above-described composition, and the composition is not particularly limited if it is a cyanide bath and the additive agent contains no antimony.

As described above, the nickel-plating layer 3 and the silver-nickel alloy plating layer 4 is formed on the surface of the base material 2 to form the terminal material 1 for connectors. Furthermore, press machining and the like are performed on the terminal material 1 for connectors to form a terminal for a connector having the silver-nickel alloy plating layer 4 on the surface.

The terminal material 1 for connectors of the present embodiment can be increased in the hardness of the outermost surface of the base material 2 and improve the abrasion resistance since the silver-nickel alloy plating layer 4 formed on the outermost surface of the base material 2 contains nickel. Since intermetallic compound is not generated between silver and nickel, the hardness of the outermost surface of the base material 2 can be suppressed from being too high.

Since nickel has higher melting point than that of antimony, the heat resistance can be improved and the reduction of the hardness can be suppressed. Since the atomic radius difference between silver and nickel is larger than the atomic radius difference between silver and antimony, the hardness can be surely increased only by slightly eutectoid of nickel in the silver-nickel alloy plating layer 4 to 0.03 at % or more and 1.20 at % or less.

In the other points, detailed structures are not limited to the structure in the embodiment and various modifications may be made without departing from the scope of the present invention. For example, although the nickel-plating layer 3 and the silver-nickel alloy plating layer 4 are formed on the whole area of the upper surface of the base material 2 in the above embodiment, it is not limited to this, for example, the nickel-plating layer 3 may be formed on a part of the upper surface of the base material 2 and the silver-nickel alloy plating layer 4 may be formed on this nickel-plating layer 3; alternatively, the silver-nickel alloy plating layer 4 may be formed on a part of the upper surface of the nickel-plating layer 3 formed on the whole area of the upper surface of the base material 2. It is enough that at least the surface of a part to be a contact point when it is formed into a terminal is the silver-nickel alloy plating layer 4.

Figure 2:
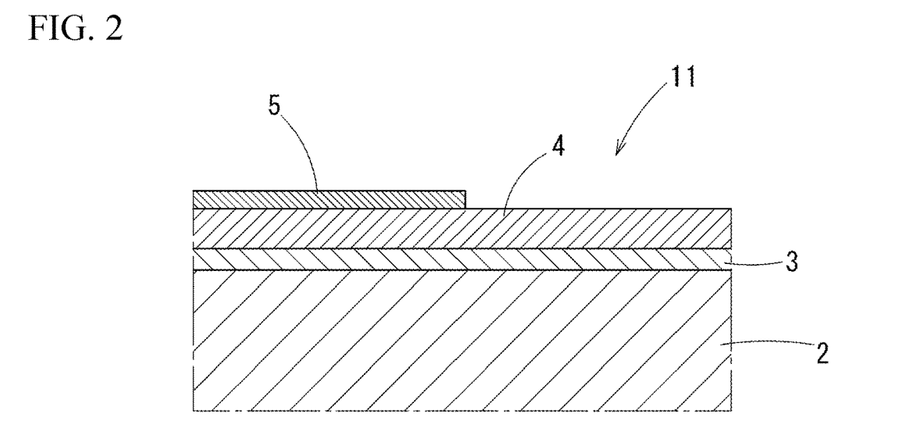
FIG. 2 It is a cross sectional view schematically showing the terminal material for connectors according to another embodiment of the present invention.

Moreover, although the outermost surface of the terminal material 1 for connectors was formed of the silver-nickel alloy plating layer 4 in the above-described embodiment, as shown in FIG. 2, a silver-plating layer 5 may be further formed on the silver-nickel alloy plating layer 4.

The silver-plating layer 5 is hardly oxidized at the surface even in the high temperature environment, so that the contact resistance can be prevented from increasing. The silver-plating layer 5 is composed of pure silver having purity of 99 mass % or more, preferably 99.9 mass % or more except for gas components such as C, H, S, O, N, and the like. The purity is 99 mass % or more because a large amount of the impurities is contained if Ag concentration of the silver-plating layer 5 is less than 99 mass % and there is a tendency that the contact resistance increases. "Except for gas components such as C, H, S, O, N, and the like" means to exclude the elements of gas components.

Although the silver-plating layer 5 is relatively soft, lubrication effect is excellent and the abrasion resistance is increased since it is supported by the hard silver-nickel alloy plating layer 4 underneath. The film thickness of the silver-plating layer 5 is preferably 0.01 µm or more and 2.0 µm or less. Since the silver-plating layer 5 having the film thickness less than 0.01 µm is too thin, it is easily worn and disappeared at an early stage. If the film thickness exceeds 2.0 µm, the soft silver-plating layer 5 is thick and the friction coefficient may be increased.

In the example shown in FIG. 2, the silver-plating layer 5 is formed only on a part of the silver-nickel alloy plating layer 4, specifically a part to be a contact when it is processed into a terminal.

Composition of a silver-plating bath for forming the silver-plating layer 5 is, not particularly limited though, for example, composed of potassium silver cyanide ($K[Ag(CN)_2]$) 45 g/L to 55 g/L, potassium cyanide (KCN) 110 g/L to 130 g/L, potassium carbonate ($K_2CO_3$) 10 g/L to 20 g/L, and additive agent. In this silver-plating bath, by performing plating treatment using a pure silver plate as an anode under condition in which bath temperature is normal temperature (25° C. to 30° C.) and electric current density is 2 $A/dm^2$ to 4 $A/dm^2$, the silver-plating layer 5 is formed.

EXAMPLES

A base material made of a copper alloy plate having a thickness 0.3 mm was prepared; pre-treatment cleansing a surface by degreasing, pickling and the like was performed on this base material (the pre-treatment step); then, nickel-plating treatment was performed on the surface of the base material to form a nickel-plating layer having a film thickness 1 µm (the nickel-plating layer forming step).

After performing the activation for cleansing the surface of nickel-plating using a potassium cyanide solution of 5 mass %, the silver-strike plating treatment was performed on the base material coated with the nickel-plating layer (the silver-strike plating step).

Then the silver-nickel alloy plating treatment was performed thereon (the silver-nickel alloy plating layer forming step), samples on which the silver-nickel ally plating layer having the film thickness, the nickel content, and the average crystal grain size shown in Table 1 and Table 2 were produced. In Table 1 and Table 2, nickel was recited as Ni, silver-nickel alloy was as Ag—Ni alloy, and Silver was as Ag. The average crystal grain in the silver-nickel alloy plating layer was recited simply as the average crystal grain size. The nickel content in the silver-nickel ally plating layer was controlled by the electric current density of the plating treatment.

Although the sample 9 was subjected to the silver-nickel alloy plating, nickel was not detected in the plating layer since the electric current density of the plating treatment was low.

In the samples 2 to 6 and 8, the silver-plating layer having the film thickness shown in Table 1 was formed on the silver-nickel alloy plating layer.

Conditions of plating were as follows.
<Nickel Plating Condition>
Plating Bath Condition
Nickel sulfamate: 300 g/L
Nickel chloride hexahydrate: 30 g/L
Boric acid: 30 g/L
Bath Temperature: 45° C.
Electric Current Density: 3 $A/dm^2$
<Silver-Strike Plating Condition>
Plating Bath Composition
Silver cyanide: 100 g/L
Potassium cyanide: 100 g/L
Anode: SUS316
Bath Temperature: 25° C.
Electric Current Density: 1 $A/dm^2$
<Silver-Nickel Alloy Plating Condition>
Plating Bath Composition
Silver potassium cyanide: 35 g/L
Potassium cyanide: 120 g/L Potassium carbonate: 35 g/L
Potassium tetracyanonickelate (II) monohydrate: 100 g/L
Additive agent: 5 ml/L
Anode: Pure silver plate
Bath Temperature: 25° C.
Electric Current Density: 4 A/dm$^2$ to 12 A/dm$^2$ The nickel content was controlled by the electric current density. For comparison, ones in which the electric current density was 2 A/dm$^2$ or 14 A/dm$^2$ which was out of this range were also produced. In the sample 9 in which the electric current density was 2 A/dm$^2$, nickel was not detected in the formed plating layer.

<Silver Plating Condition>
Plating Bath Composition
Silver potassium cyanide: 55 g/L
Potassium cyanide: 130 g/L
Potassium carbonate: 15 g/L
brightener: (AgO-56 made by Atotech Japan K.K.): 4 ml/L
Bath Temperature: 25° C.
Electric Current Density: 3 A/dm$^2$
Anode: Pure silver plate Regarding the samples, the film thickness of the plating layer formed by the silver-nickel alloy plating treatment, the nickel content in the plating layer and the average crystal grain size of the plating layer, and the film thickness of the plating layer formed by the silver-plating treatment were measured; and presence of cracks after indent processing, the contact resistance and the abrasion resistance before and after heating were measured.

[Measurement of Film Thickness of Plating Layers]

The film thickness of the plating layer formed by the silver-nickel alloy plating treatment and the silver-plating treatment was measured as follows. Sectional processing was performed on the samples using a focused ion beam device: FIB (model number: SMI3050 TB) made by Seiko Instruments Co. Ltd., and film thicknesses at arbitrary three points in a sectional SIM (Scanning Ion Microscopy) image of at an incline angel 60° were measured and an average thereof was obtained, then converted to an effective length. Measurement results are shown in Table 1. As shown in Table 1, the film thickness of the nickel-plating layer formed by the nickel-plating treatment was 1 μm in every sample.

TABLE 1

| SAMPLE | Ni Plating Ni-Plating Layer Film Thickness μm | Ag—Ni Alloy Plating Plating Layer Film Thickness μm | Ag Plating Plating Layer Film Thickness μm |
|---|---|---|---|
| 1 | 1 | 4.0 | — |
| 2 | 1 | 4.0 | 1.0 |
| 3 | 1 | 1.8 | 1.0 |
| 4 | 1 | 5.0 | 0.8 |
| 5 | 1 | 1.0 | 1.0 |
| 6 | 1 | 1.5 | 0.5 |
| 7 | 1 | 8.5 | — |
| 8 | 1 | 1.5 | 2.5 |
| 9 | 1 | 5.0 | — |
| 10 | 1 | 0.3 | — |
| 11 | 1 | 28.0 | — |
| 12 | 1 | 17.0 | — |
| 13 | 1 | 5.0 | — |

[Measurement of Average Crystal Grain Size of Plating Layer]

Regarding the samples 1 to 8 and 10 to 13, a cross section along a growing direction of electrodeposition of the plating film (the plate thickness direction of the base material) was processed by an ion-milling method, a measuring area 200 nm×400 nm was measured with a measuring step 2 nm using a transmission electron microscope (TEM) with EBSD; it was analyzed using this data and an analysis software, considering a span of measuring points where orientation difference between the adjacent measuring points was 5° or more as crystal boundaries, and the crystal grain size (including twin crystals) of the plating layer by the silver-nickel alloy plating treatment was measured.

The obtained crystal grain size was approximated to an area circle to calculate the average crystal grain size by a weighted average weighted by an area. The results measured before and after heating at 150° C. for 240 hours are shown in Table 2.

A device and analysis software used for measuring the average crystal grain size of the silver-nickel alloy plating layer of the samples 1 to 8 and 10 to 13 are as follows.

EBSD device: OIM Data Collection made by EDAX/TSL Company
Analysis software: OIM Data Analysis ver. 5.2 made by EDAX/TSL Company Regarding the sample 9, since nickel was not contained, the average crystal grain size of the silver-nickel alloy plating layer was large and was not possible to be measured by the above-described method, so it was measured as follows.

A cross section along the growing direction of electrodeposition of the plating film (the plate thickness direction of the base material) was processed by an ion-milling method, a measuring area 3500 μm×1000 nm was measured with a measuring step 0.04 μm using a field emission scanning electron microscope (FE-SEM) with EBSD, it was analyzed using this data and an analysis software, considering a span of measuring points where orientation difference between the adjacent measuring points was 5° or more as crystal boundaries, and the crystal grain size (including twin crystals) was measure.

The obtained crystal grain size was approximated to an area circle to calculate the average crystal grain size by a weighted average weighted by an area. The results measured before and after heating at 150° C. for 240 hours are shown in Table 2.

A device and analysis software used for measuring the average crystal grain size of the plating layer of the sample 9 are as follows.

EBSD device: OIM Data Collection made by EDAX/TSL Company
FE-SEM: JSM-7001FA made by JEOL Ltd.
Analysis software: OIM Data Analysis ver. 5.2 made by EDAX/TSL Company

[Measurement of Nickel Content (Ni Content)]

Using rf-GD-OES (Glow Discharge Optical Emission Spectroscopy) high-frequency glow discharge emission spectrometric device made by HORIBA, Ltd., the nickel content (at %) in the plating layer formed by the silver-nickel alloy plating treatment was measured. In this method, even if the silver-plating layer is formed on the surface layer (on the silver-nickel alloy plating layer), the composition can be measured without removing the silver-plating layer.

In this case, the sample was cut out from arbitrary part, and element distribution was measured while sputtering in a depth direction from the surface. The measurement area had a diameter of 4 mm, and elements having an atomic number of 27 or less was excluded. In the measurement, an ultra-high purity Ar gas was used, the sputtering was performed where the gas pressure was 600 Pa, the high frequency output was 35 W, the pulse frequency was 1000 Hz, the Duty Cycle was 0.25 (25% discharge), and the intake interval was 0.01 s.

The nickel content (at %) in the plating layer was obtained from the element distribution when the plating layer was sputtered about 0.2 μm of the film thickness, using a semiquantitative kit to convert it to composition (at %). The measurement results are shown in Table 2.

The nickel content (at %) in the plating layer can be measured also using an electron probe microanalyzer EPMA (model number JXA-8530F) made by JEOL, Ltd., for example. However, if the film thickness of the plating layer was not sufficiently thick, nickel in the nickel-plating layer that is an under coating is also detected and the measurement value becomes large for that; accordingly, the measurement by the above-described GD-OES is appropriate.

TABLE 2

Ag—Ni Alloy Plating Treatment

| SAMPLE | Plating Electric Current Density A/dm² | Plating Layer | | |
|---|---|---|---|---|
| | | Ni Content at % | Average Crystal Size nm Before Heating | Grain Size nm After Heating |
| 1 | 9 | 0.73 | 54 | 63 |
| 2 | 9 | 0.73 | 54 | 63 |
| 3 | 7 | 0.41 | 50 | 66 |
| 4 | 6 | 0.29 | 87 | 146 |
| 5 | 12 | 1.16 | 34 | 36 |
| 6 | 11 | 0.99 | 26 | 28 |
| 7 | 14 | 1.91 | 17 | 24 |
| 8 | 6 | 0.41 | 47 | 55 |
| 9 | 2 | (0) | 730 | 1200 |
| 10 | 7 | 0.46 | 41 | 58 |
| 11 | 8 | 0.61 | 71 | 98 |
| 12 | 9 | 0.69 | 47 | 52 |
| 13 | 4 | 0.03 | 121 | 195 |

Regarding the obtained samples, as shown below, the presence of cracks after the indent processing was detected, the contact resistance was measured, and the abrasion resistance test was performed.

[Presence of Cracks after Indent Processing]

After performing the indent processing forming a half-ball protruding part of 3 mm of radius curvature on the samples, the top part of the protruding surface of the protruding part was observed to confirm whether cracks existed. Observing with magnifying 50 times, ones in which the nickel-plating layer was detected under the cracks in the sample were determined as cracked ("A" in the table), and ones in which it was not detected were determined as non-cracked ("C" in the table). The measurement results are shown in Table 3.

[Measurement of Contact Resistance]

The samples were cut out to a test piece α of 60 mm×30 mm and a test piece β of 60 mm×10 mm; a flat plate test piece α was a substitute for a male terminal (a male terminal test piece), and a test piece β on which the indent processing was performed on a flat plate to form the half-ball protruding part with the radius of curvature 3 mm was a substitute for a female terminal (a female terminal test piece).

Regarding these test pieces, the contact resistance (mΩ) was measured before hating and after heating at 150° C. for 240 hours. For the measurement, using a friction and abrasion test device (UMT-Tribolab) made by Bruker AXS Inc., the protruding surface of the protruding part of the female terminal test piece was in contact with the male terminal test piece which is horizontally arranged, and the contact resistance value of the male terminal test piece measured by the four-terminal method when 10 N load was added. The measurement results are shown in Table 3. The contact resistance was not measured in the sample in which the cracks were generated by the indent processing.

[Abrasion Resistance Test]

Regarding the samples 2, 4, 9, and 10, test pieces α and β having the same shape as that of the test pieces used for measuring the contact resistance were prepared. Pressing the protruding surface of the protruding part of the test piece β and the test piece α to each other with load 5 N and rubbing together at 50 times repetition for length 5 mm, it was observed whether either of the nickel-plating layer which was the undercoat was exposed or not using SEM-EDS (scanning electron microscope). The flat plate side and the protruding part side were both observed respectively, and ones in which a half or more of the rubbed part was exposed was determined as "C", ones in which the exposure was detected in a small part less than the half was determined as "B", and ones in which no exposure was detected was determined as "A". The measurement results are shown in Table 3.

TABLE 3

| | | Contact Resistance | | Abrasion Resistance Test | |
|---|---|---|---|---|---|
| SAMPLE | Presence of Cracks | Before Heating mΩ | After Heating mΩ | Test Piece α (Flat Plate) | Test Piece β (Protruding Part) |
| 1 | A | 0.71 | 0.85 | — | — |
| 2 | A | 0.46 | 0.50 | A | A |
| 3 | A | 0.45 | 0.51 | — | — |
| 4 | A | 0.47 | 0.49 | A | B |
| 5 | A | 0.46 | 0.49 | — | — |
| 6 | A | 0.49 | 0.53 | — | — |
| 7 | A | 0.76 | 0.95 | — | — |
| 8 | A | 0.45 | 0.48 | — | — |
| 9 | A | 0.42 | 0.49 | C | C |
| 10 | A | 0.65 | 0.82 | C | C |
| 11 | C | — | — | — | — |
| 12 | A | 0.41 | 0.71 | — | — |
| 13 | A | 0.43 | 0.49 | — | — |

In the samples 1 to 6, 8, 12, and 13, the cracks were not generated after the indent processing, the contact resistance value was small both before heating and after heating (150° C. for 240 hours), and it was shown that the heat resistance was high.

In cases of the samples 1 to 6, 8, and 12, the average crystal grain size of the silver-nickel alloy plating layer was small even after heating, and suppressed to be coarsened.

Among those, the samples 2 to 6 and 8 on which the silver-plating layer was formed have especially low value of the contact resistance before heating, and the low contact resistance is maintained also after heating, the heat resistance can be improved. Moreover, it is found that the abrasion resistance is excellent.

In the sample 13, since the nickel content is small in the silver-nickel alloy plating layer, the contact resistance can be obtained as the same extent of the samples 2 to 6 and 8 on which the silver-plating layer; however, the crystal grain size of the silver-nickel alloy plating layer is slightly large after heating.

Figure 3:
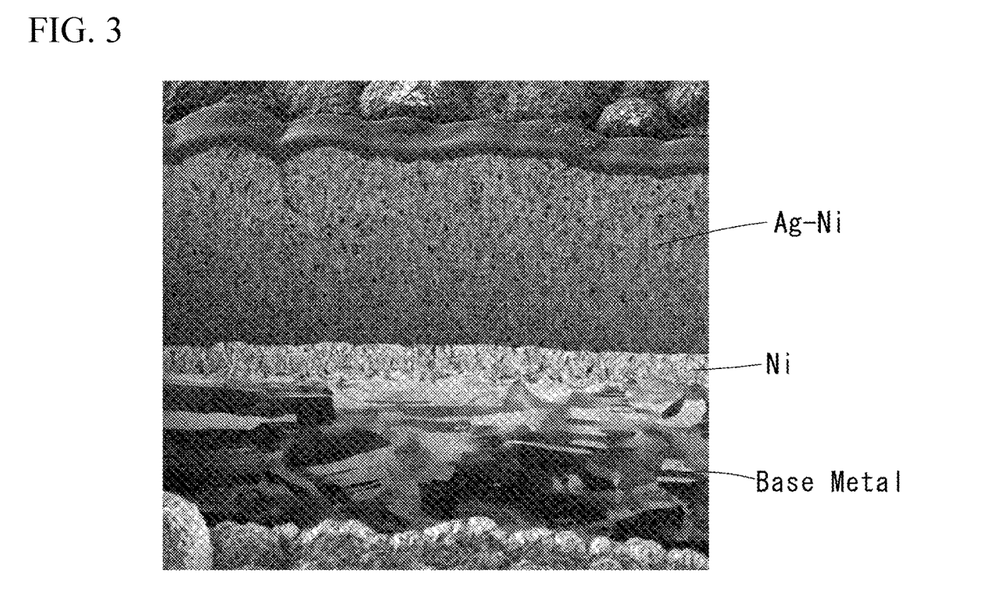
FIG. 3 It is an SIM (Scanning Ion Microscope) image of a cross section of a terminal material for connectors in a sample 1 before heating.

FIG. 3 shows a cross section SIM image of the sample 1; it is shown that the silver-nickel alloy plating layer (denoted as Ag—Ni) is formed on the nickel-plating layer (denoted as Ni) on the surface of the base material (denoted as Base Material).

Figure 4:
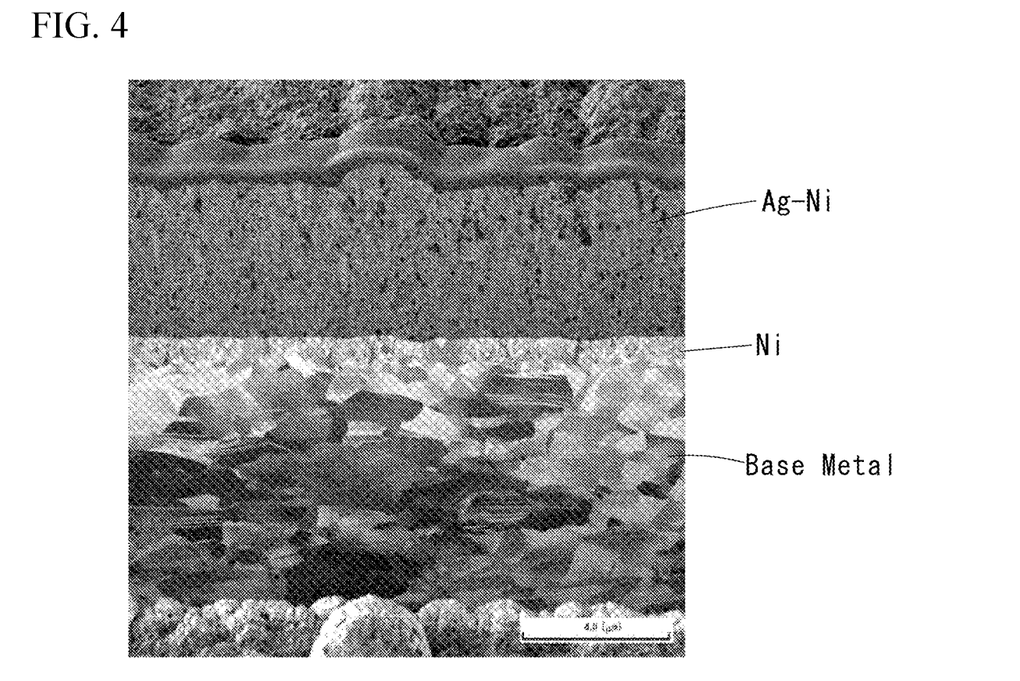
FIG. 4 It is an SIM image of the cross section of the terminal material for connectors in the sample 1 after heating.

FIG. 4 is a cross section SIM image of the sample 1 after heating (at 150° C. for 240 hours); it is shown that the average crystal grain size of the silver-nickel alloy plating layer is small even after heating and maintained to be fine.

In comparison with the above-mentioned samples, defects were found in the samples 7 and 9 to 11 as follows.

In the sample 7, the nickel content in the silver-nickel alloy plating layer was large and roughness of the surface of the plating layer was large. That is to say, since the nickel content is large, the precipitated crystal grains were rough, the amount of impurities was large because it involved the plating solution while precipitation, the impurities and nickel were oxidized by heating, and the contact resistance increased.

In the sample 9, nickel was not detected in the plating layer formed by the silver-nickel alloy plating treatment. Accordingly, the average crystal grain size of the silver-nickel alloy plating layer was large, it was furthermore coarsened also after heating, and it was found that the undercoat nickel-plating layer was exposed also in the abrasion resistance test.

In the sample 10, the film thickness of the silver-nickel alloy plating layer was small as 0.3 μm, the undercoat nickel-plating layer was remarkably exposed in the abrasion resistance test.

In the sample 11, since the film thickness of the silver-nickel alloy plating layer was large as 28.0 μm, cracks were found after the indent processing.

INDUSTRIAL APPLICABILITY

According to the present invention, the abrasion resistance and the heat resistance of the terminal material for connectors can be improved.

REFERENCE SIGNS LIST

1 Terminal material for connectors
2 Base material
3 Nickel-plating layer
4 Silver-nickel alloy plating layer
5 Silver-plating layer

The invention claimed is:

1. A terminal material for connectors comprising
a base material wherein at least a surface layer is made of copper or copper alloy;
a nickel-plating layer made of nickel or nickel alloy coating a surface of the base material; and
a silver-nickel alloy plating layer formed on at least a part of the nickel-plating layer, having a film thickness 0.5 μm or more and 20.0 μm or less, a nickel content 0.03 at % or more and 1.20 at % or less, and an average crystal grain size 10 nm or more and 150 nm or less.

2. The terminal material for connectors according to claim 1, wherein the film thickness of the silver-nickel alloy plating layer is 1.0 μm or more and 10.0 μm or less.

3. The terminal material for connectors according to claim 2, wherein the nickel content of the silver-nickel alloy platin layer is 1.00 at % or less.

4. The terminal material for connectors according to claim 3, further comprising a silver-plating layer wherein silver purity except for C, H, S, O and N which are gas components is 99 mass % or more and a film thickness is 0.01 μm or more and 2.0 μm or less.

5. The terminal material for connectors according to claim 3, wherein a film thickness of the nickel-plating layer is 0.2 μm or more and 5.0 μm or less.

6. The terminal material for connectors according to claim 5, wherein the film thickness of the nickel-plating layer is 0.3 μm or more and 2.0 μm or less.

7. The terminal material for connectors according to claim 2, further comprising a silver-plating layer wherein silver purity except for C, H, S, O and N which are gas components is 99 mass % or more and a film thickness is 0.01 μm or more and 2.0 μm or less.

8. The terminal material for connectors according to claim 2, wherein a film thickness of the nickel-plating layer is 0.2 μm or more and 5.0 μm or less.

9. The terminal material for connectors according to claim 8, wherein the film thickness of the nickel-plating layer is 0.3 μm or more and 2.0 μm or less.

10. The terminal material for connectors according to claim 1, wherein the nickel content of the silver-nickel alloy platin layer is 1.00 at % or less.

11. The terminal material for connectors according to claim 10, further comprising a silver-plating layer wherein silver purity except for C, H, S, O and N which are gas components is 99 mass % or more and a film thickness is 0.01 μm or more and 2.0 μm or less.

12. The terminal material for connectors according to claim 10, wherein a film thickness of the nickel-plating layer is 0.2 μm or more and 5.0 μm or less.

13. The terminal material for connectors according to claim 12, wherein the film thickness of the nickel-plating layer is 0.3 μm or more and 2.0 μm or less.

14. The terminal material for connectors according to claim 1, further comprising a silver-plating layer wherein silver purity except for C, H, S, O and N which are gas components is 99 mass % or more and a film thickness is 0.01 μm or more and 2.0 μm or less.

15. The terminal material for connectors according to claim 14, wherein a film thickness of the nickel-plating layer is 0.2 μm or more and 5.0 μm or less.

16. The terminal material for connectors according to claim 15, wherein the film thickness of the nickel-plating layer is 0.3 μm or more and 2.0 μm or less.

17. The terminal material for connectors according to claim 1, wherein a film thickness of the nickel-plating layer is 0.2 μm or more and 5.0 μm or less.

18. The terminal material for connectors according to claim 17, wherein the film thickness of the nickel-plating layer is 0.3 μm or more and 2.0 μm or less.

* * * * *